(12) United States Patent
Larsen et al.

(10) Patent No.: US 7,782,856 B1
(45) Date of Patent: Aug. 24, 2010

(54) FORWARDING DATA PACKETS HAVING TAGS CONFORMING TO DIFFERENT FORMATS

(75) Inventors: Loren Douglas Larsen, Veradale, WA (US); Andrew Patrick Schultz, Spokane, WA (US); Kelly Donald Fromm, Newman Lake, WA (US); Keith Michael Bly, Newman Lake, WA (US)

(73) Assignee: World Wide Packets, Inc., Spokane Valley, WA (US)

( * ) Notice: Subject to any disclaimer, the term of this patent is extended or adjusted under 35 U.S.C. 154(b) by 386 days.

(21) Appl. No.: 11/548,865

(22) Filed: Oct. 12, 2006

(51) Int. Cl.
*H04L 12/28* (2006.01)
*H04L 12/56* (2006.01)

(52) U.S. Cl. .................. 370/392; 370/395.53; 370/397; 370/409

(58) Field of Classification Search .................. 370/392, 370/395.53, 397, 409
See application file for complete search history.

(56) References Cited

U.S. PATENT DOCUMENTS 7,430,208 B1 * 9/2008 Patra et al. ............... 370/395.1

| 2003/0199246 | A1 * | 10/2003 | Friedman et al. | 455/3.01 |
|---|---|---|---|---|
| 2004/0052263 | A1 * | 3/2004 | Xu | 370/399 |
| 2004/0057469 | A1 * | 3/2004 | Nuss et al. | 370/535 |
| 2005/0041665 | A1 * | 2/2005 | Weyman et al. | 370/390 |
| 2006/0100993 | A1 * | 5/2006 | Allen et al. | 707/3 |
| 2006/0227811 | A1 * | 10/2006 | Hussain et al. | 370/503 |
| 2006/0274744 | A1 * | 12/2006 | Nagai et al. | 370/389 |
| 2007/0127459 | A1 * | 6/2007 | Lo et al. | 370/389 |

* cited by examiner

*Primary Examiner*—Alpus H Hsu
*Assistant Examiner*—Saad Hassan
(74) *Attorney, Agent, or Firm*—Clements Bernard PLLC; Christopher L. Bernard; Tyler S. Brown

(57) ABSTRACT

This document describes tools that forward data packets having tags conforming to different formats. In one embodiment, the tools receive a data packet on each of a plurality of ports, each data packet comprising a tag conforming to a different format. The tools relay the data packets to a port capable of transmitting tags conforming to a plurality of formats. In another embodiment, the tools receive a plurality of data packets on a source port comprising a plurality of logical source ports, each of which is associated with a unique tag. At least one data packet is received on each logical source port. Each data packet includes the tag associated with the logical source port on which the data packet is received. The tools map each data packet to one of a plurality of virtual switches based on the logical source port on which the data packet is received.

20 Claims, 9 Drawing Sheets

| | Port | Logical Port | Tag Type | Tag Value | Virtual Switch | Provisional Tag Type | Provisional Tag Value |
|---|---|---|---|---|---|---|---|
| 614 → | 408 | 426 | 0x8100 | 6:1:100 | 414 | 0x8100 | *:500 |
| 616 → | 412 | 434 | 0x88a8 | 6:1:100 | 414 | 0x8100 | *:500 |
| 618 → | 604 | 420 | 0x9100 | 6:1:100 | 414 | 0x8100 | *:500 |

| | Port | Logical Port | Tag Type | Tag Value | Virtual Switch |
|---|---|---|---|---|---|
| 504 → | 408 | 426 | 0x8100 | 6:1:100 | 414 |
| 506 → | 412 | 434 | 0x9100 | 6:1:100 | 414 |
| 508 → | 406 | 420 | 0x8100 | 6:1:100 | 414 |

| | Port | Logical Port | Tag Type | Tag Value | Virtual Switch | Provisional Tag Type | Provisional Tag Value |
|---|---|---|---|---|---|---|---|
| 614 → | 408 | 426 | 0x8100 | 6:1:100 | 414 | 0x8100 | *:500 |
| 616 → | 412 | 434 | 0x88a8 | 6:1:100 | 414 | 0x8100 | *:500 |
| 618 → | 604 | 420 | 0x9100 | 6:1:100 | 414 | 0x8100 | *:500 |

FORWARDING DATA PACKETS HAVING TAGS CONFORMING TO DIFFERENT FORMATS

BACKGROUND

Network operators commonly use a portion of a data packet designated as a tag to identify data packets associated with a particular subscriber. The tag enables network devices that are part of a service provider network to segregate data packets based on the subscriber with which the data packets are associated. For example, a service provider may use a single service provider network to provide data services to two subscribers. Since the service provider network is accessible to both subscribers, the service provider may need to prevent one subscriber from having access to data packets associated with the other subscriber. Tags enable such separation by identifying the subscriber associated with each data packet.

Data packets may include one or more of a variety of tags. For example, Multiprotocol Label Switching (MPLS) tags are commonly used to associate data packets with an MPLS label-switched path. Virtual Local Area Network (VLAN) tags, such as tags defined by the Institute of Electrical and Electronic Engineers (IEEE) 802.1Q and 802.1ad standards, are also common. Each of these types of tags may use a different format. For example, an MPLS tag may occupy a significantly larger portion of a data packet than a VLAN tag.

Conventional switches are capable of sending and receiving data packets having a single type of tag on a particular port. These switches are not capable of sending and receiving a data packet with an MPLS tag and a data packet with an 802.1Q VLAN tag on a single port. Service providers, however, have a need to support different types of tags on a single port because they want their networks to accommodate as many subscribers as possible, even if the subscribers do not all use the same tag type.

One way to support multiple tag types on a single port is to translate tags from one type to another type. For example, an MPLS tag could be translated to a VLAN tag. However, such translations may result in a loss of information, especially when translating to a tag type that uses fewer bits than the native tag type.

Another way of supporting multiple tag types is to dedicate one port of each network device to each of a plurality of tag types. This approach requires the network operator to dedicate additional ports and links, such as copper or fiber cables, to relaying data packets having a particular tag type even if the number of data packets relayed by the port is far less than the port's capacity. Consequently, this approach is inefficient and expensive.

SUMMARY

This document describes tools that forward data packets having tags conforming to different formats. In one embodiment, the tools receive a data packet on each of a plurality of ports, each data packet comprising a tag conforming to a different format. The tools relay the data packets to a port capable of transmitting tags conforming to a plurality of formats. In another embodiment, the tools receive a plurality of data packets on a source port comprising a plurality of logical source ports, each of which is associated with a unique tag. At least one data packet is received on each logical source port. Each data packet includes the tag associated with the logical source port on which the data packet is received. The tools map each data packet to one of a plurality of virtual switches based on the logical source port on which the data packet is received.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE DRAWINGS

The same numbers are used throughout the disclosure and figures to reference like components and features.

DETAILED DESCRIPTION

Overview

The following document describes tools capable of forwarding data packets having tags conforming to different formats. An environment in which the tools may enable these and other actions is set forth below in a section entitled Exemplary Operating Environment. This is followed by another section describing exemplary ways in which the tools may act to both aggregate data packets having tag values conforming to different formats onto a destination port and de-multiplex data packets received on a source port having tag values conforming to different formats. This second section is entitled Exemplary Embodiments for Sending and Receiving Data Packets Having Tags Conforming to Different Formats on a Port. A final section describes these and other embodiments and manners in which the tools may act and is entitled Other Embodiments of the Tools. This overview, including these section titles and summaries, is provided for the reader's convenience and is not intended to limit the scope of the claims or the entitled sections.

Exemplary Operating Environment

Before describing the tools in detail, the following discussion of an exemplary operating environment is provided to assist the reader in understanding some ways in which various inventive aspects of the tools may be employed. The environment described below constitutes an example and is not intended to limit application of the tools to any one particular operating environment. Other environments may be used without departing from the spirit and scope of the claimed subject matter.

Figure 1:
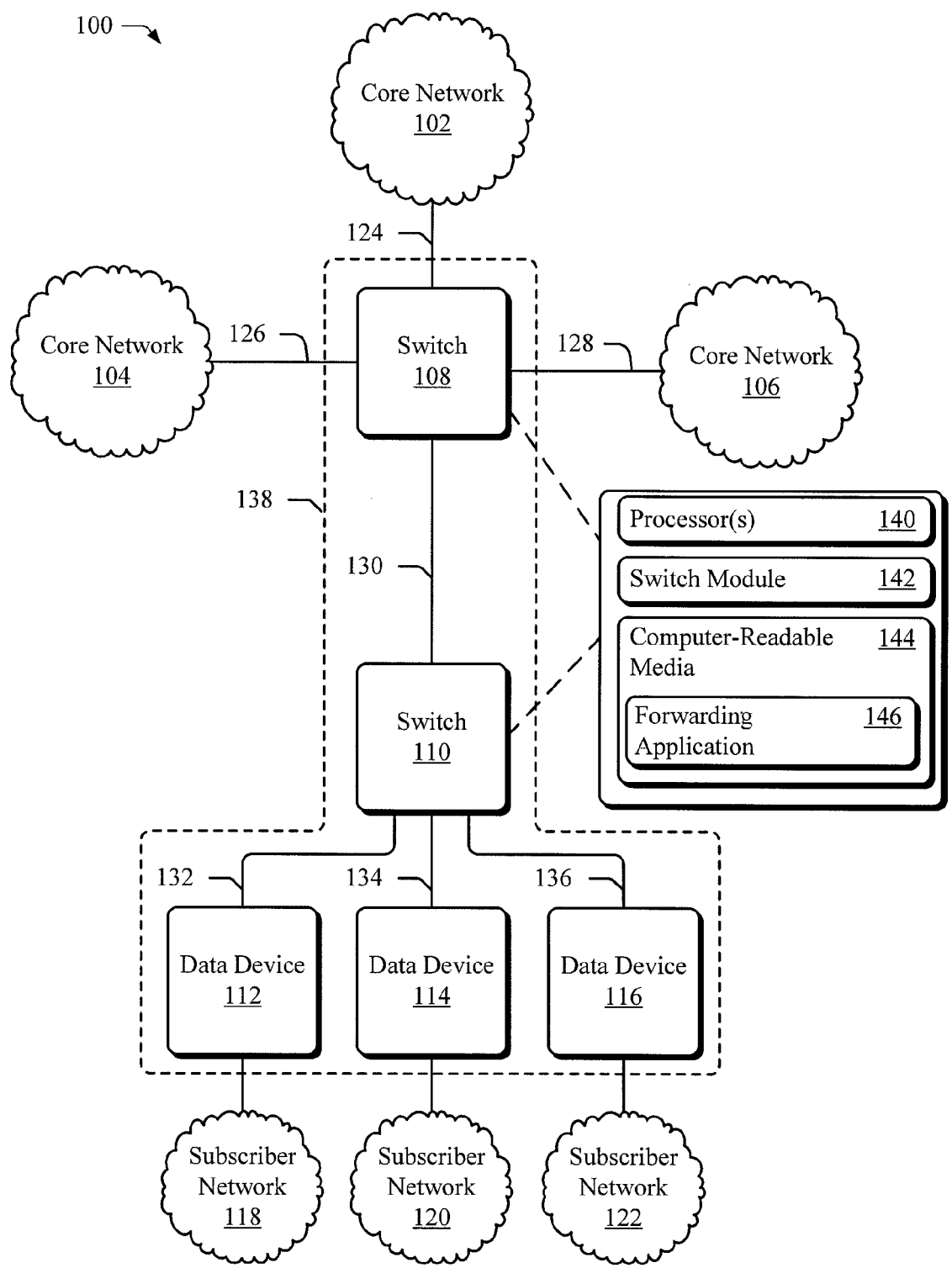
FIG. 1 illustrates an exemplary operating environment in which various embodiments of the tools may operate.

FIG. 1 illustrates one operating environment generally at 100 for enabling switches to forward data packets having tags conforming to different formats. The environment includes three core networks 102, 104, 106; two switches 108, 110; three data devices 112, 114, 116; three subscriber networks 118, 120, 122; and seven connecting links 124, 126, 128, 130, 132, 134, 136.

The core networks provide services to subscribers such as an Internet service. In addition, the core networks may provide connectivity between two or more geographically dispersed subscriber locations. An access network 138, comprising the switches 108, 110 and the data devices 112, 114, 116, provides connectivity between the subscriber networks and the core networks by relaying data packets between the subscriber networks and the core networks.

The subscriber networks are networks operated by individual subscribers. For example, subscriber network 118 may be a Local Area Network (LAN) within an office owned by a subscriber. Note that each subscriber network is not directly connected to a core network by a private access network. Instead, a single shared access network connects the subscriber networks to the core networks.

Each core network comprises a plurality of network devices such as switches, routers, servers, computers, and the like. One of these devices in each core network connects to switch 108. Thus, a network device in core network 102 connects to switch 108 via link 124, a network device in core network 104 connects to switch 108 via link 126, and a network device in core network 106 connects to switch 108 via link 128.

A port on each of these network devices is capable of sending or receiving only data packets having tags conforming to a single format. Thus, the data packets relayed on link 124 have tags conforming to a single format. Data packets relayed on link 126 may have tags conforming to a different format than the format used on link 124, but the data packets relayed on link 126 have tags conforming to a single format. Similarly, the data packets relayed on link 128 have tags conforming to a single format.

Switch 108 and switch 110 may each be a switch, router, or other device capable of forwarding data packets having tags conforming to different formats. Although the switches illustrated in FIG. 1 are each connected to four or fewer devices (a switch or a data device), the switches may generally be connected to more than four devices. Each switch comprises a plurality of ports that transmit and receive data packets. Each switch forwards a data packet received on one port of the switch to one or more of the other ports of the switch based on a destination address included in the data packet.

Switch 110 may be used to aggregate data packets. For example, switch 110 may receive data packets from data devices 112, 114, and 116 and forward the data packets on a single link to switch 108. Using switch 110 to aggregate data packets from several switches may be a more efficient manner of operating a network than if data devices 112, 114, and 116 were each directly connected to switch 110, especially if the distance between the data devices and switch 110 is long.

Each switch 108, 110 may comprise one or more processor(s) 140, a switch module 142, and computer-readable media 144. The computer-readable media includes a forwarding application 146 comprising a set of executable instructions that when executed forward data packets having tags conforming to different formats. The switch module 142 may comprise one or more switch chips capable of forwarding data packets from one switch port to another switch port. The processor(s) are capable of accessing and/or executing the computer-readable media and may be further capable of configuring the switch module to operate in a particular manner. In some embodiments, the switch module may access and/or execute portions of the computer-readable media.

Each switch may alternatively comprise a programmable logic device, such as a Field Programmable Gate Array (FPGA), and the computer-readable media 144. In this embodiment, the FPGA is capable of accessing and/or executing the computer-readable media, including the forwarding application and forwarding data packets from one switch port to another switch port.

In yet another alternative embodiment, each switch may comprise a network processor and computer-readable media. In this embodiment, the network processor is capable of accessing and/or executing the computer-readable media, including the forwarding application and forwarding data packets from one switch port to another switch port.

The data devices may comprise a switch, router, computer, server, or other device capable of sending and receiving data packets. The data devices 112, 114, 116 may exchange data packets with one or more of the core networks through the access network 138 to accomplish a desired result.

Each port of each data device may be capable of sending or receiving only data packets having tags conforming to a single format. Thus, the data packets relayed on link 132 have tags conforming to a single format. Data packets relayed on link 134 may have tags conforming to a different format than the format used on link 132, but the data packets relayed on link 134 have tags conforming to a single format. Similarly, the data packets relayed on link 136 have tags conforming to a single format.

Each subscriber network comprises a plurality of network devices such as switches, routers, servers, computers, and the like. One of these devices connects to one of the data devices 112, 114, 116. Thus, a network device in subscriber network 118 connects to data device 112, a network device in subscriber network 120 connects to data device 114, and a network device in subscriber network 122 connects to data device 116.

The links 124, 126, 128, 130, 132, 134, 136 provide a communication path between two devices, enabling the two devices to exchange data packets. Each link comprises a medium. For example, the medium may be twisted-pair copper, single-mode fiber, multi-mode fiber, a radio frequency, or other medium.

Each link also comprises a protocol used to communicate over the physical medium. For example, the devices may communicate using Ethernet data packets, Asynchronous Transfer Mode (ATM) cells, Time Division Multiplexing (TDM) messages, or the like. Additionally, each link may use higher-level protocols such as Internet Protocol (IP) or Transmission Control Protocol (TCP).

Each link may comprise a plurality of physical media. For example, a single link may comprise three strands of single-mode fiber that are logically grouped together into a link aggregation group.

Figure 2:
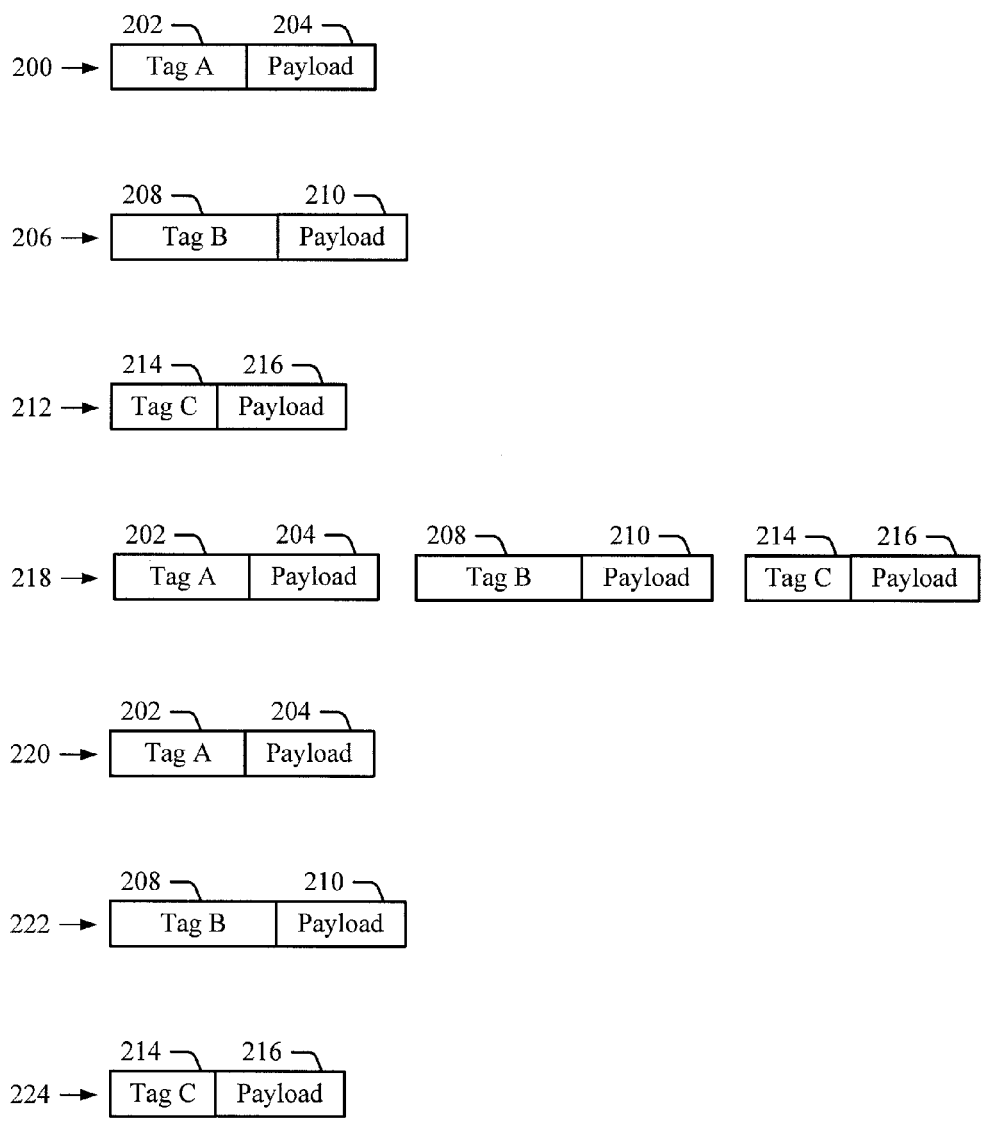
FIG. 2 illustrates an exemplary set of data packets relayed within the exemplary operating environment.

FIG. 2 illustrates sample data packets having tags conforming to various formats that are relayed by the access network of FIG. 1. The varying tag lengths of the illustrated data packets are intended to convey the fact that different tag formats may specify tags of different lengths. In actual implementation, the relative lengths of the tag and payload portions of the sample data packets may vary. Of course, the sample data packets may also comprise a source address, a destination address, and other fields.

The sample data packets may be representative of data packets sent from the subscriber networks to the core networks. In this embodiment, sample data packet 200 is a data packet sent by data device 112 to switch 110 on link 132. This sample data packet includes a destination address (not illustrated) addressing the data packet to a destination device that is part of core network 102. The sample data packet comprises a tag conforming to format "A" 202 and payload 204. Data device 112 is only capable of sending data packets having tags conforming to format "A" on link 132.

Data devices 114 and 116 send similar data packets. Sample data packet 206 is a data packet sent by data device 114 to switch 110 on link 134. This sample data packet includes a destination address (not illustrated) addressing the data packet to a destination device that is part of core network 104. The sample data packet comprises a tag conforming to format "B" 208 and payload 210. Data device 114 is only capable of sending data packets having tags conforming to format "B" on link 134.

Sample data packet 212 is a data packet sent by data device 116 to switch 110 on link 136. This sample data packet includes a destination address (not illustrated) addressing the data packet to a destination device that is part of core network 106. The sample data packet comprises a tag conforming to format "C" 214 and payload 216. Data device 116 is only capable of sending data packets having tags conforming to format "C" on link 136.

Switch 110 receives each of the three data packets 200, 206, 212 and relays the three data packets to switch 108 on link 130. Switch 108 receives the three data packets on link 130 despite the fact that each data packet has a tag conforming to a different format.

The three tag formats used by the three data packets may each be specified by a different standard. For example, tag format "A" may conform to the VLAN format specified by the IEEE 802.1Q standard, tag format "B" may conform to the VLAN format specified by the IEEE 802.1ad standard, and tag format "C" may conform to a third standard.

The sample data packets depicted in set 218 are relayed by switch 110 to switch 108 on link 130. Note that in relaying the sample data packets, switch 110 does not alter the tags. Instead, switch 110 multiplexes the three data packets, each having a different tag format, onto link 130.

Switch 108 receives the three sample data packets having different tag formats from switch 110 on a single link, link 130. Switch 108 then forwards each sample data packet to a different core network. Sample data packet 220 is a data packet sent by switch 108 to core network 102 on link 124. Core network 102 is only capable of receiving data packets having tags conforming to format "A" on link 124. Sample data packet 222 is a data packet sent by switch 108 to core network 104 on link 126. Core network 104 is only capable of receiving data packets having tags conforming to format "B" on link 126.

Sample data packet 224 is a data packet sent by switch 108 to core network 106 on link 128. Core network 106 is only capable of receiving data packets having tags conforming to format "C" on link 128. Note that the tags 202, 208, 214 and payloads 204, 210, 216 of these three data packets are the same tags and payloads sent by the data devices, as illustrated by sample data packets 200, 206, and 212.

The sample data packets may also illustrate data packets sent from the core networks to the subscriber networks. In this embodiment, sample data packet 224 is a data packet sent by core network 102 to switch 108 on link 124. This sample data packet includes a destination address (not illustrated) addressing the data packet to a device that is part of subscriber network 118. Similar data packets 222, 220 are sent by core network 104 and core network 106.

Switch 108 receives each of the three data packets 220, 222, 224 and relays the three data packets to switch 110 on link 130 despite the fact that each data packet has a tag conforming to a different format. The sample data packets depicted in set 218 are relayed by switch 108 to switch 110 on link 130. Note that in relaying the sample data packets, switch 108 does not alter the tags of any of the data packets. Instead, switch 108 multiplexes the three data packets, each having a different tag format, onto link 130.

Switch 110 receives the three data packets having different tag formats from switch 108 on a single link, link 130. Switch 110 then forwards each data packet to the appropriate data device. Sample data packet 200 is a data packet sent by switch 110 on link 132 to subscriber network 118 via data device 112, sample data packet 206 is a data packet sent by switch 110 on link 134 to subscriber network 120 via data device 114, and sample data packet 212 is a data packet sent by switch 110 on link 136 to subscriber network 122 via data device 116.

Figure 3:
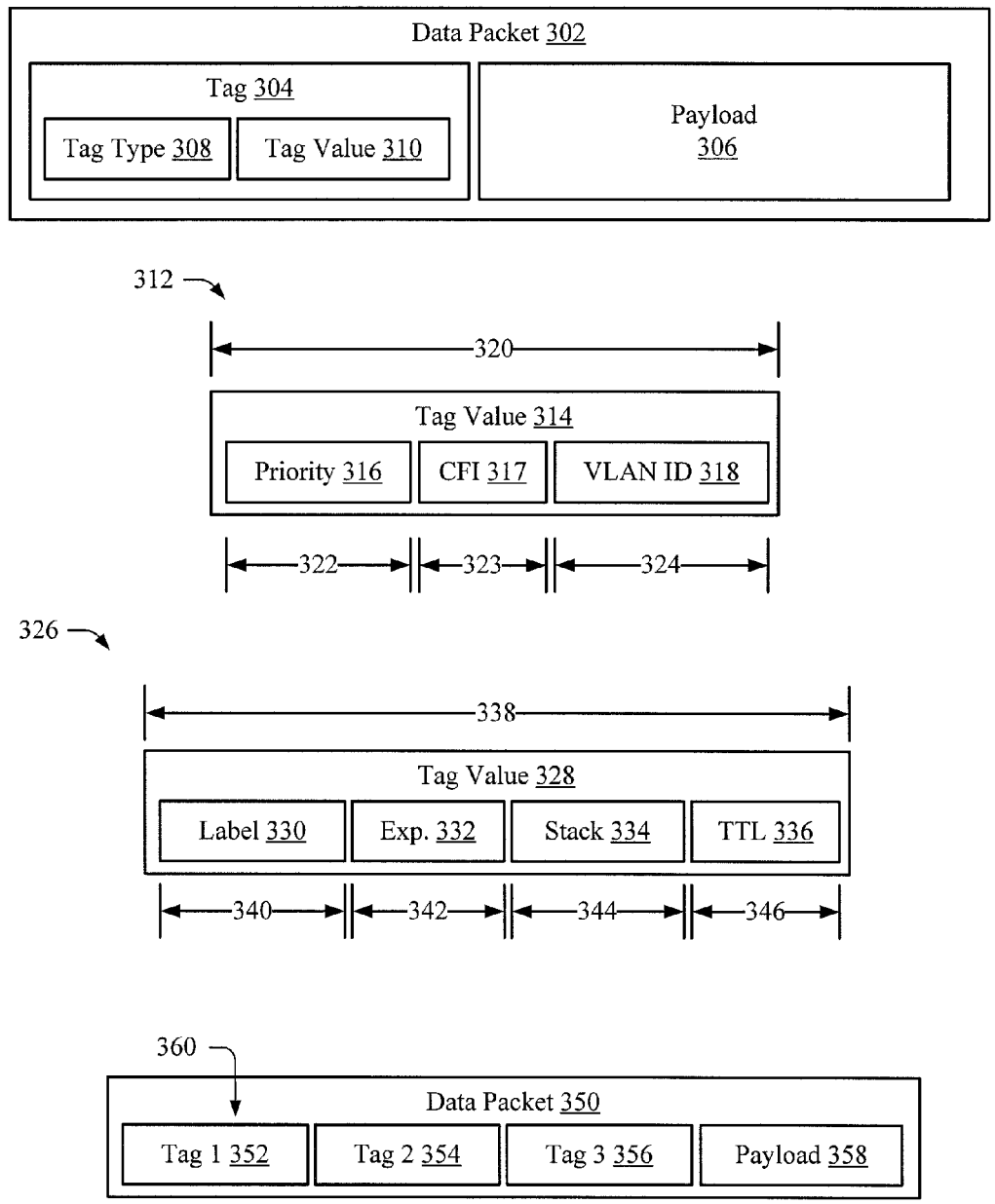
FIG. 3 illustrates exemplary data packets and data packet formats.

Exemplary Embodiments for Sending and Receiving Data Packets Having Tags Conforming to Different Formats on a Port FIG. 3 illustrates two exemplary data packets and two exemplary tag formats. The exemplary data packets and tag formats illustrated have been simplified for clarity. The exemplary data packets and tag formats may include additional fields and the lengths and positions of the fields illustrated may vary in implementation. Exemplary data packet 302 comprises a tag 304 and payload 306, each occupying a portion of the data packet. Of course, the data packet may also comprise other portions, such as a source address, a destination address, and the like.

The payload 306 contains a message, or portion of a message being relayed by the data packet. The tag and additional portions of the data packet other than the payload are overhead information added to the data packet to ensure that the payload gets to the proper destination. Typically, the payload portion of the data packet is much larger than the overhead portions.

As was discussed above, network operators commonly use the tag 304 to identify data packets belonging to a particular subscriber or service. The tag enables network devices to segregate data packets having one tag from data packets having a different tag. The tag 304 is distinct from the payload portion and comprises a tag type 308 and a tag value 310.

The tag type 308 may comprise a predetermined number of bits within the tag. The values assigned to the bits of the tag type indicate a particular tag format to which the tag value 310 conforms. A correlation between a particular tag-type bit value and a particular format may be determined by an industry standard, an informal agreement, or other method of communicating which formats correlate with which tag-type bit values.

In one embodiment, the tag type is a sixteen-bit Ethertype field defined by the IEEE registration authority. In this embodiment, an Ethertype field having a value of 0x8100 (a hexadecimal value) specifies a tag format defined by the 802.1Q standard, an Ethertype field having a value of 0x88A8 specifies a tag format defined by the 802.1ad standard, and an Ethertype field having a value of 0x8847 specifies a unicast MPLS tag format. Of course, the IEEE registration authority also defines other Ethertype values and corresponding formats. In addition, vendors may define proprietary formats corresponding with an Ethertype value such as the format associated with Ethertype 0x9100.

As a network device encounters the tag type, it determines from the tag type the format to which the bits following the tag type will conform. Without the tag type, the network device may not know how long the succeeding tag value is and therefore may not know where the tag value ends and the payload portion of the data packet begins. Some network devices may only accept data packets having a particular tag type. These network devices, on encountering an unknown tag type in a data packet, may drop the data packet.

The tag format specifies the length of the tag value, the position of fields within the tag value, the possible values that the tag value may have, and other parameters. FIG. 3 illustrates two exemplary tag formats 312, 326.

Exemplary tag format 312 depicts the format specified by IEEE 802.1Q. Tag format 312 specifies the length 320 (in bits) of the tag value 314, in this case sixteen bits. The tag format also specifies that the sixteen-bit tag value is made up of three fields, a priority field 316, a canonical format indicator (CFI) field 317, and a VLAN Identifier (VLAN ID) field 318. The tag format specifies that the priority field has a length 322 of three bits and that the priority field is the first three bits of the tag value. In addition, the tag format also specifies the length 323 and position of the CFI field and the length 324 and position of the VLAN ID field.

Exemplary tag format 326 depicts the format of an MPLS unicast tag value. The tag format 326 specifies the length 338 (in bits) of the tag value 328, in this case thirty-two bits. The tag format also specifies the lengths 340, 342, 344, 346 and positions of four fields 330, 332, 334, 336 within the tag value. The four fields are the label field, the experimental field, the stack field, and the time-to-live (TTL) field.

A plurality of tags, each having the same tag value, may each conform to a different format. For example, a first tag conforming to a first format may comprise a tag value six bits long assigned the binary values 000100 (equivalent to four in decimal). A second tag conforming to a second format may comprise a tag value four bits long assigned the binary values 0100 (also equivalent to four in decimal). These two tags are distinguishable, however, since each conforms to a different format, the first tag being six bits long and the second tag being four bits long. Since the two tags conform to different formats, they have different tag types.

A plurality of tags, each conforming to the same format and having the same tag type, may have different tag values. For example, a first tag may conform to the 802.1Q format, which specifies that the tag has a three-bit priority field and a twelve-bit VLAN ID field, and may have a priority field value of three and a VLAN ID field value of eight. A second tag, also conforming to the 802.1Q format may have a priority field value of five and a VLAN ID field value of eleven.

A single data packet may include a plurality of tags in some embodiments. Network devices typically handle these data packets by acting on only one of the tags, the tag located in a priority position of the data packet, and ignoring the other tags. The tag in the priority position could be the tag in the leftmost position within the packet. Alternatively, the tag in the priority position could be the tag in the rightmost position within the packet. The priority position could also be some other predetermined position within the data packet. The tag itself could also indicate whether it is in the priority position using one or more bits.

Exemplary data packet 350 is a data packet comprising three tags 352, 354, 356 and a payload portion 358. Tag 1 352, in this exemplary data packet, is in a priority position 360 because it is in the leftmost position. Consequently, network devices encountering data packet 350 will act based on tag 1 and will ignore the other tags.

Figure 4:
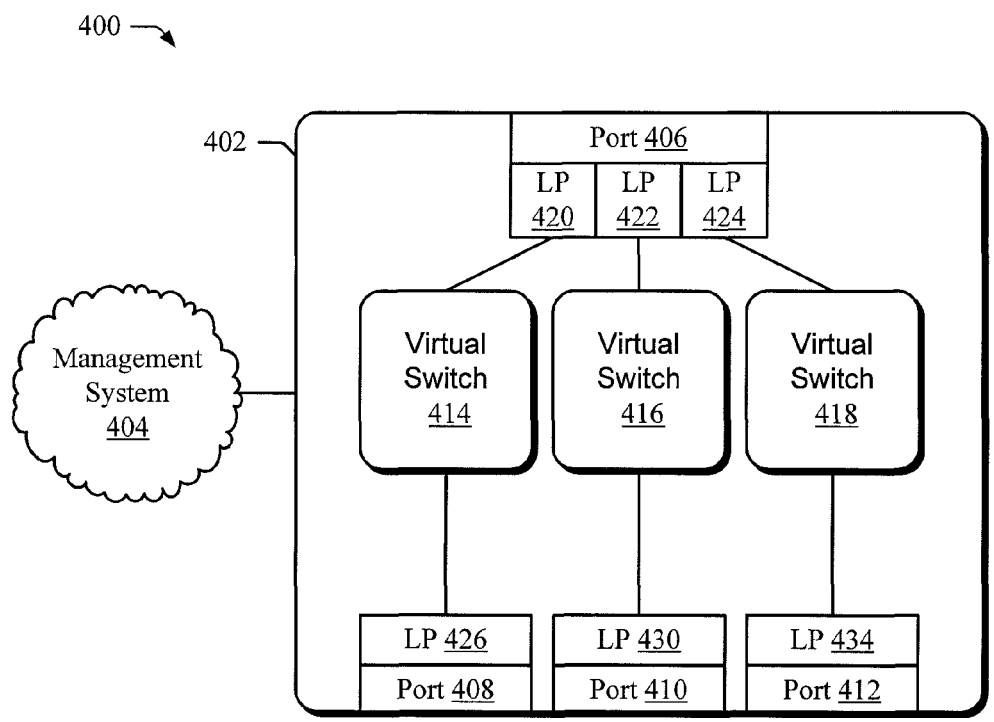
FIG. 4 illustrates an exemplary switch capable of forwarding data packets having tags conforming to different formats in a first configuration.

FIG. 4 is a block diagram 400 illustrating an exemplary switch capable of forwarding data packets having tags conforming to different formats. The block diagram 400 includes a switch 402 and a management system 404. The switch 402 comprises three virtual switches 414, 416, 418; a plurality of ports 406, 408, 410, 412 each comprising one or more logical ports 420, 422, 424, 426, 430, 434. Instances of switch 402 may be used as switch 108 and switch 110 of FIG. 1.

The switch receives data packets on its ports and forwards each data packet to a different port than it was received on according to a destination address contained within each data packet. Each port transmits data packets forwarded to it on a link connected to the port. Links are not illustrated in FIG. 4 for simplicity, but are illustrated in FIG. 1 described above. Each received data packet includes a tag made up of a tag type and tag value as described above in relation to FIG. 3.

The switch may use virtual switches 414, 416, 418 to segregate data packets within the switch based on their tags. The switch may comprise a single virtual switch, or may comprise a plurality of virtual switches. In fact, the number of virtual switches may change over time according to a configuration provided by the management system.

Each virtual switch comprises two or more interfaces on which data packets may be sent and received. The virtual switch forwards a data packet received on one of its interfaces to one of its other interfaces based on the data packet's destination address. Once a data packet has been received on a virtual switch interface, it is confined to that virtual switch and prevented from being forwarded to an interface associated with a different virtual switch.

Each port 406, 408, 410, 412 receives data packets and transmits data packets. Although exemplary switch 402 is depicted as having four ports, the switch could have as few as two ports and could have more than four ports.

Each port may comprise one or more logical ports. For example, port 406 comprises three logical ports 420, 422, 424; port 408 comprises one logical port 426; port 410 comprises one logical port 430; and port 412 comprises one logical port 434.

Each port is logically divided into one or more logical ports so that all data packets having a particular tag, or portion of a tag, that are sent or received on the port are assigned to a particular logical port. Thus, data packets having a first tag or portion of a tag that are received on a port belong to a first logical port and data packets having a second tag or portion of a tag that are received on the same port belong to a second logical port.

Each logical port is associated with a port, a tag or portion of a tag, and a virtual switch. The portion of a tag may be the tag type, the tag value, or one or more fields of the tag value. In one embodiment, the management system configures the association. The management system may configure a logical port for each unique tag. In this embodiment, one logical port is created, for example, for a tag having a first tag type and a first tag value and another logical port is created for a tag having the first tag type and a second tag value.

In another embodiment, a logical port is created for each tag type without regard for the tag value. In this embodiment, a single logical port is created, for example, for tags having a first tag type and a first tag value and tags having the first tag type and a second tag value. Other ways of creating logical ports may also be used which are well known to those of skill in the art.

As a data packet is received by a port, it is assigned to one of the logical ports associated with the port based on its tag. In one embodiment, data packets received on a port that have a tag that does not match any logical port associated with the port are discarded. In another embodiment, data packets received on a port that have a non-matching tag are assigned to a default logical port.

Some data packets may not be assigned to a logical port. For example, the port may be configured to forward control frames, such as Bridge Protocol Data Units, received on the port without assigning them to a logical port.

Each logical port may be associated with a virtual switch. As a data packet is received on a port and associated with a logical port, it is forwarded to the virtual switch associated with the logical port. The virtual switch forwards the data packet to another virtual switch interface associated with the virtual switch. The virtual switch may forward the data packet to the other virtual switch interface based on a portion of the data packet, such as the data packet's destination address or tag. Alternatively, the virtual switch may forward the data packet to the other virtual switch interface based on metadata associated with the data packet that is not a part of the data packet, such as the logical port on which the data packet was received. This virtual switch interface is the destination interface for the data packet.

The destination interface is also associated with a logical port that is the logical destination port for the data packet. The destination interface forwards the data packet to the logical destination port, which is associated with a port. This port is the destination port for the data packet. The destination port receives the data packet from the logical destination port and then transmits the data packet on a link connected to the destination port.

In one embodiment, the destination interface ensures that the data packet includes the tag associated with the logical destination port and that the tag is in a priority position before forwarding the data packet to the logical destination port. The priority position of a data packet is described above in relation to FIG. 3. If the data packet does not include the tag associated with the logical destination port, the interface may replace a tag existing in the data packet with the tag associated with the logical destination port.

In another embodiment, a port comprising logical ports all associated with a single tag type but not associated with a single tag value ensures that each data packet transmitted by the port has the single tag type. If a data packet waiting to be transmitted by the port has a different tag type, the port may overwrite the different tag type with the single tag type before transmitting the data packet. Overwriting the different tag type may ensure that a network device to which the port is connected will not drop the data packet, since the network device may only be capable of receiving data packets having the single tag type.

The management system 404 provides configuration information to the switch that instructs the switch to configure itself in a particular way. For example, the management system may send the switch a configuration communication instructing it to associate a logical port with a particular tag, port, and virtual switch. A network operator uses the management system to achieve a desired network configuration.

The management system may use a number of methods of providing the configuration communication to the switch such as a Simple Network Management Protocol (SNMP) message, a configuration file, a user-initiated configuration command, a Common Object Request Broker Architecture (CORBA) command, an Application Programming Interface (API) call, or other method of configuring a switch well known to those of skill in the art.

FIG. 4 illustrates one exemplary configuration imposed on switch 402 by the management system 404. Several data-packet forwarding scenarios may be illustrated using the exemplary configuration. In one scenario, the switch receives a first data packet having a first tag comprising a first tag type and a first tag value from a network device, such as one of the data devices of FIG. 1, on port 408.

As described above in relation to FIG. 1, the network device is capable of sending data packets to the switch that conform to the same format and have the same tag type and is not capable of sending some data packets having one tag type and other data packets having a different tag type on a single link. The first data packet is addressed to a device connected directly or indirectly to port 406.

Port 408 identifies the first data packet's tag as being the first tag. Port 408 then determines that the first tag is associated with its associated logical port, logical port 426. Since logical port 426 is associated with virtual switch 414, as indicated by the line connecting virtual switch 414 to logical port 426, the first data packet is forwarded to virtual switch 414.

Virtual switch 414 examines the first data packet's destination address and determines that the first data packet should be forwarded to logical port 420, which is associated with virtual switch 414 and with port 406. Consequently, the first data packet is forwarded to port 406.

In a similar manner, the switch receives and forwards a second and third data packet, both addressed to a device connected directly or indirectly to port 406. These data packets are also sent by network devices capable of sending data packets to the switch that conform to the same format and have the same tag type but incapable of sending some data packets having one tag type and other data packets having a different tag type on a single link.

The second data packet is received by port 410 and forwarded to virtual switch 416 through logical port 430. Virtual switch 416 then forwards the second data packet to port 406 through logical port 422. Finally, a third data packet is received by port 412 and forwarded to virtual switch 418 through logical port 434. Virtual switch 418 then forwards the third data packet to port 406 through logical port 424.

Port 406 multiplexes the first, second, and third data packets onto a link connected to port 406 (not illustrated) by transmitting the three data packets one at a time on the link. In doing so, the switch transmits data packets having tags comprising the first tag type, data packets having tags comprising the second tag type, and data packets having tags comprising the third tag type on a single port, port 406. For example, port 406 may transmit data packets conforming to the IEEE 802.1Q standard, data packets conforming to the IEEE 802.1ad standard, and MPLS data packets all on a single link.

In another scenario, the switch receives a first data packet having a first tag type, a second data packet having a second tag type, and a third data packet having a third tag type from a network device connected to port 406, such as switch 108 of FIG. 1 described above. The network device is capable of sending data packets to the switch that have tags conforming to different formats.

The first data packet is addressed to a device connected directly or indirectly to port 408, the second data packet is addressed to a device connected directly or indirectly to port 410, and the third data packet is addressed to a device connected directly or indirectly to port 412.

Port 406 identifies the first data packet's tag as being the first tag. Port 406 then determines that the first tag is associated with one of its associated logical ports, logical port 420. Since logical port 420 is associated with virtual switch 414, as indicated by the line connecting virtual switch 414 to logical port 420, the first data packet is forwarded to virtual switch 414.

Virtual switch 414 examines the first data packet's destination address and determines that the first data packet should be forwarded to logical port 426, which is associated with virtual switch 414 and with port 408. Consequently, the first data packet is forwarded to port 408.

In a similar manner, the second data packet is forwarded to virtual switch 416 through logical port 422. Virtual switch 416 then forwards the second data packet to port 410 through logical port 430. Finally, the third data packet is forwarded to virtual switch 418 through logical port 424. Virtual switch 418 then forwards the third data packet to port 412 through logical port 434.

Figure 5:
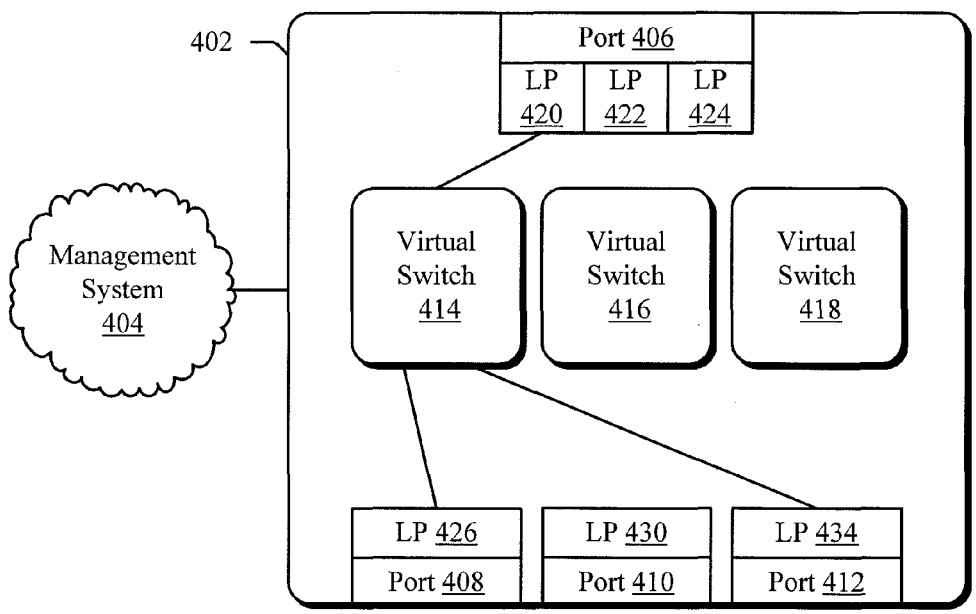
FIG. 5 illustrates an exemplary switch capable of forwarding data packets having tags conforming to different formats in a second configuration as well as an exemplary configuration table.

FIG. 5 is a block diagram 500 illustrating the exemplary switch 402 and management system 404 of FIG. 4 in a second exemplary configuration. In this exemplary configuration, logical ports 420, 426, and 434 are associated with virtual switch 414. In addition, FIG. 5 illustrates a configuration table 502 containing a portion of the exemplary configuration applied to the switch.

In this exemplary configuration, virtual switches 416 and 418 are depicted as not being connected to a logical port. Of course, this configuration is just exemplary. Virtual switches 416 and 418 may be in use simultaneously with virtual switch 414 and may be associated with logical ports not illustrated in FIG. 5.

The exemplary configuration depicted in FIG. 5 illustrates the concept that logical ports that are associated with a virtual switch need not be associated with a common tag, tag type, or tag value for data packets to be forwarded between the logical ports. The fact that the logical ports are each associated with the same virtual switch is sufficient to enable data packets to be forwarded between the logical ports.

If the tags of the logical ports associated with a virtual switch are not identical, the switch will replace the tag of a data packet forwarded to the virtual switch with the tag associated with the logical destination port (the logical port to which the data packet is forwarded) before the data packet is transmitted by a port.

Configuration table 502 contains an exemplary configuration that illustrates this concept. Row 504 of the table specifies that logical port 426 of port 408 is associated with a tag type of 0x8100, a tag value of 6:1:100, and with virtual switch 414. Accordingly, data packets received on logical port 426 have a tag type of 0x8100 and a tag value of 6:1:100.

The tag type 0x8100, according to industry agreement, specifies that the tag value conforms to the IEEE 802.1Q standard and therefore has three fields: a priority field, a CFI field, and a VLAN ID field. Thus, the tag value of row 504 has three fields separated by a colon. The first field, "6" is the priority field, the second field "1" is the CFI field, and the third field "100" is the VLAN ID field.

Furthermore, row 504 specifies that data packets transmitted on port 408 that are associated with logical port 426 are transmitted with a tag type of 0x8100 and a tag value of 6:1:100. Thus, tag types and tag values of data packets forwarded from virtual switch 414 to port 408 through logical port 426 will be replaced, if necessary, so that they have a tag type of 0x8100 and a tag value of 6:1:100.

Alternatively, the switch may be configured to replace the mismatched tag type and certain mismatched fields of the tag value, but preserve other fields of the tag value. For example, the switch may replace the VLAN ID field of a tag having tag type 0x8100 but preserve the priority and CFI fields, even if they are mismatched. In yet another embodiment, the switch may be configured to replace the mismatched tag type and to preserve the entire tag value.

Row 506 specifies that data packets received on logical port 434 will have a tag type of 0x9100 and a tag value of 6:1:100 (specifying a priority field of 6, a CFI field of 1, and a VLAN ID field of 100) and data packets forwarded to logical port 434 will have their tags replaced if necessary so that they have a tag type of 0x9100 and tag value of 6:1:100 before being transmitted by port 412.

Tag type 0x9100 is a tag type used in the networking industry that has a corresponding format specifying a tag value having fields with the same widths and same positions as the format specified by IEEE 802.1Q. One difference between the tags is the fact that they have different tag types. One, IEEE 802.1Q, uses 0x8100 and the other uses 0x9100. Another tag type, 0x88A8, also has a very similar format. This tag type is specified by the IEEE 802.1ad standard. One reason for using tag type 0x9100 or 0x88A8 is that these tag types are conventionally used when a data packet has two tags. Thus, a tag type of 0x9100 or 0x88A8 may imply that a second tag follows the first tag.

Finally, according to row 508, data packets received on logical port 420 will have a tag type of 0x8100 and a tag value of 6:1:100 and data packets forwarded to logical port 420 will have their tags replaced if necessary so that they have a tag type of 0x8100 and tag value of 6:1:100 before being transmitted by port 406.

Accordingly, a data packet received on port 412 and belonging to logical port 434 that is addressed to a device connected directly or indirectly to port 406 will have a tag comprising a tag type of 0x9100 and a tag value of 6:1:100. The data packet will be forwarded to virtual switch 414, which will forward the data packet to logical port 420. Before the data packet is transmitted by port 406, the switch will replace the data packet's tag type so that it has a tag type of 0x8100. The switch need not replace the tag value in this example, but in some embodiments, the switch may replace the tag value anyway.

Figure 6:
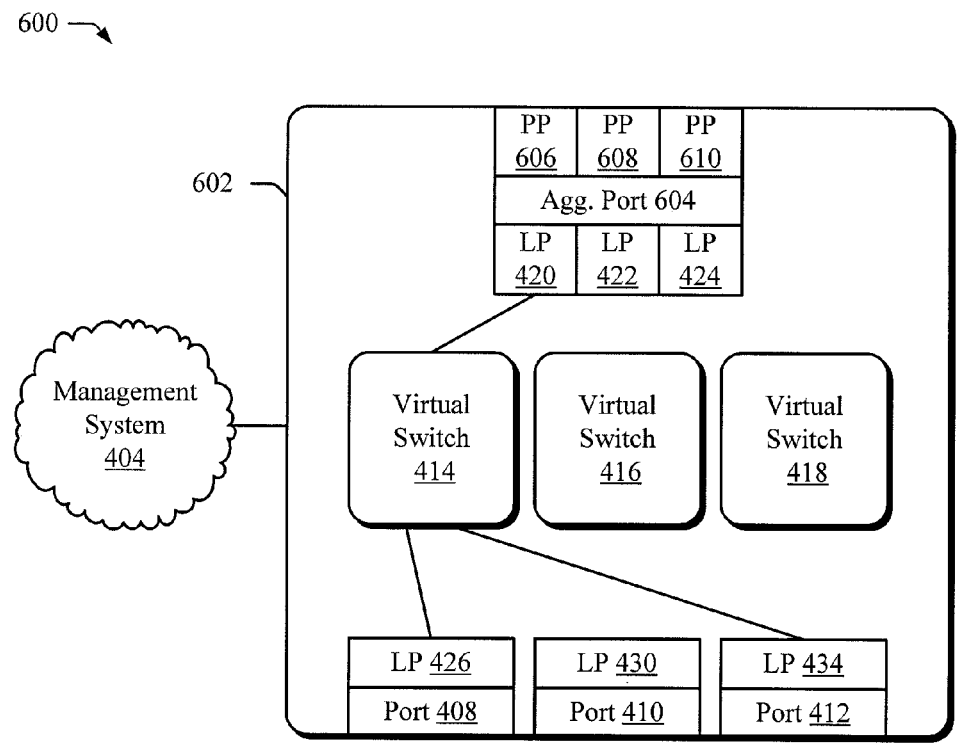
FIG. 6 illustrates another exemplary switch capable of forwarding data packets having tags conforming to different formats by using provisional tags as well as an exemplary configuration table.

FIG. 6 is a block diagram 600 illustrating an exemplary switch 602 and the management system 404 of FIG. 4 in an exemplary configuration. The exemplary switch 602 is substantially the same as exemplary switch 402 of FIGS. 4 and 5 except that switch 602 includes an aggregation port 604 comprising three physical ports 606, 608, 610. In this exemplary configuration, logical ports 420, 426, and 434 are associated with virtual switch 414. In addition, FIG. 6 illustrates a configuration table 612 containing a portion of the exemplary configuration applied to switch 602.

Aggregation ports may be useful when a port is likely to exceed the bandwidth of the physical link to which it is connected. For example, if the link is twisted pair copper and relays Ethernet data packets it may relay data packets at a rate of up to 100 Million bits per second (Mbps).

The three physical ports 606, 608, 610 depicted in FIG. 6 provide aggregation port 604 with additional bandwidth by transmitting and receiving data packets for aggregation port 604 on three different physical links rather than just one. Using the three physical ports in the example above, aggregation port 604 may relay data packets at a rate of up to 300 Mbps.

An additional advantage of the physical ports is that they provide redundancy. If one of the three links is damaged, for example due to a cable cut, the other two links may continue to relay data packets for aggregation port 604.

The physical ports may relay data packets only for the aggregation port 604. In one embodiment, the physical ports 606, 608, 610 and the aggregation port 604 form an IEEE 802.3ad Ethernet link aggregation group. Any of the ports described earlier with respect to FIGS. 4, 5, and 6 could be aggregation ports.

In one embodiment, switch 602 comprises a conventional Ethernet switch chip used to realize virtual switch 414. In this embodiment, a VLAN is configured on the Ethernet switch chip that acts as virtual switch 414.

The switch associates a VLAN with each virtual switch according to a configuration received from the management system. The switch maps a data packet it receives on a logical port associated with a particular virtual switch to the VLAN corresponding with the particular virtual switch by replacing the original tag or portions of the original tag of the data packet with a provisional tag.

The provisional tag comprises a provisional tag type and a provisional tag value substantially similar to the tag type and tag value described above in relation to FIG. 3. The provisional tag type, in one embodiment, is 0x8100, the type corresponding to the IEEE 802.1Q standard to which conventional Ethernet switch chips conform.

The switch may replace the tag by overwriting the tag with the provisional tag. Alternatively, the switch may add the provisional tag to the data packet without overwriting the original tag. In this embodiment, the switch moves the original tag from a priority position to a non-priority position and then adds the provisional tag to the data packet in the priority position. In this embodiment, the switch chip forwards the data packet based on the provisional tag and ignores the original tag.

If the original tag is overwritten, the switch may preserve the priority field of original tag value by overwriting the tag type, CFI field, and VLAN ID field of the tag value and leaving the priority field of the tag value in place. If the data packet uses a tag format that has a priority field with more than three bits, for example six bits, the switch may map a plurality of six-bit priorities into a single three-bit priority field of the provisional tag value rather than overwriting the priority field with a single value.

Once the data packet's tag has been replaced with a provisional tag, the conventional Ethernet switch chip forwards the data packet to a logical destination port belonging to the VLAN. The switch chip prevents the data packet from being forwarded to logical destination ports not belonging to the VLAN.

Once the data packet has been forwarded to a logical destination port, the switch replaces the provisional tag with a transmission tag, which is the tag associated with the logical destination port. If the original tag was overwritten, then the provisional tag is overwritten with the transmission tag.

If the provisional tag was added to the data packet without overwriting the original tag, the provisional tag is removed and the original tag is restored to the priority position. In this case, the switch then determines whether the original tag is the same as the transmission tag. If the original tag is the same, no further tag changes are necessary. If the original tag is not the same, the original tag is overwritten with the transmission tag. The switch then transmits the data packet on the port associated with the logical destination port.

Configuration table 612 contains an exemplary configuration that illustrates this concept. Row 614 of the table specifies that logical port 426 of port 408 is associated with a tag type of 0x8100, a tag value of 6:1:100, virtual switch 414, and with a provisional tag having a provisional tag type of 0x8100 and a provisional tag value of *:500. The "*" in the provisional tag value of *:500 indicates that the priority value of original tag type is preserved when replacing the original tag with the provisional tag.

Accordingly, data packets received on logical port 426 have their tags replaced with a provisional tag of 0x8100 and a VLAN ID of 500 and data packets forwarded to logical port 426 have their provisional tags replaced with a tag having a tag type of 0x8100 and a tag value of 6:1:100.

Row 616 specifies that data packets received on logical port 434 have their tags replaced with a provisional tag of 0x8100 and a VLAN ID of 500, the same provisional tag used for logical port 426, and that data packets forwarded to logical port 434 have their provisional tags replaced with a tag having a tag type of 0x88A8 and a tag value of 6:1:100.

Finally, row 618 specifies that data packets received on logical port 420 have their tags replaced with a provisional tag of 0x8100 and a VLAN ID of 500, the same provisional tag used for logical ports 426 and 434, and that data packets forwarded to logical port 420 have their provisional tags replaced with a tag having a tag type of 0x9100 and a tag value of 6:1:100.

Note that each of the three rows describe logical ports that are associated with virtual switch 414 and therefore each of the three rows prescribe the same provisional tag type and value, thereby ensuring that data packets received on the three logical ports will all be forwarded to the same VLAN in the switch chip.

In other embodiments, virtual switches are realized in a way substantially similar to that described above but using MPLS tags, Generic Routing Encapsulation, or Layer 2 Tunneling Protocol in place of VLAN tags.

In another embodiment, switch 602 realizes virtual switch 414 using metadata. Metadata is data that describes a data packet. For example, metadata may include the port the data packet was received on, the logical port the data packet is associated with, the virtual switch the data packet is associated with, and other data describing the data packet. The metadata is separate from the data packet itself and is not added to the data packet.

The switch uses this metadata to decide which logical port each received data packet is forwarded to. In this embodiment, the switch may comprise a switch fabric that is capable of restricting the ports a data packet may be forwarded to based on the metadata.

Other Embodiments of the Tools

Figure 7:
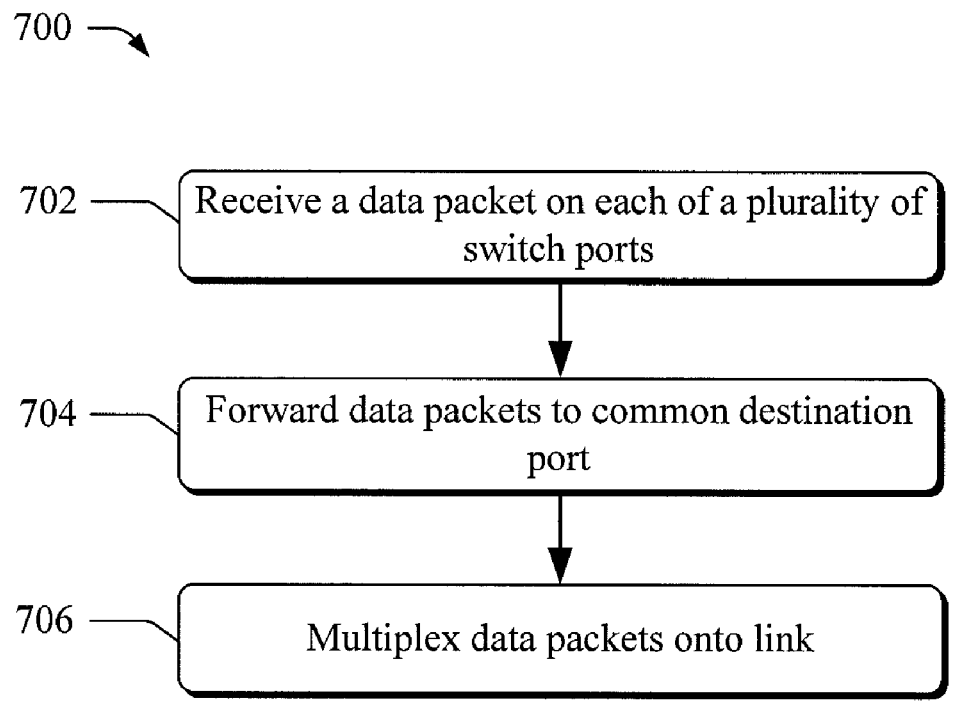
FIG. 7 is an exemplary process illustrating various embodiments and manners in which the tools multiplex data packets onto a link.

The section above describes exemplary ways in which the tools forward data packets having tags conforming to different formats. The section below describes additional embodiments of the tools, including processes. Each of the processes below may be performed by a switch through computer-executable instructions on computer-readable media, hardware, a combination of both, or otherwise. FIG. 7 illustrates a process 700 as a series of blocks representing individual operations or acts performed by the tools.

At block 702, the tools receive a data packet on each of a plurality of switch ports. Each data packet comprises a tag occupying a portion of the data packet such as the tag described above in relation to FIG. 3. The tag comprises a tag type and a tag value. The tag type identifies a format to which the tag value conforms. The tag type and tag value may be the tag type and tag value described above in relation to FIG. 3. Each of the data packets is received on a different switch port and each data packet has a different tag type.

The format may be one of the tag formats described above in relation to FIG. 3. Alternatively, the format may be another format that specifies the length of the tag value and the length and position of fields within the tag value.

At block 704, the tools forward each of the data packets received at block 702 to a common destination port. The common destination port is configured to transmit data packets having a plurality of tag types. The tools may forward the data packets to a common destination port through a virtual switch as was described above in relation to FIG. 4.

At block 706, the tools multiplex the data packets onto a link connected to the common destination port. The tools may multiplex the data packets by transmitting one data packet at a time on the link as was described above in relation to FIG. 4.

Figure 8:
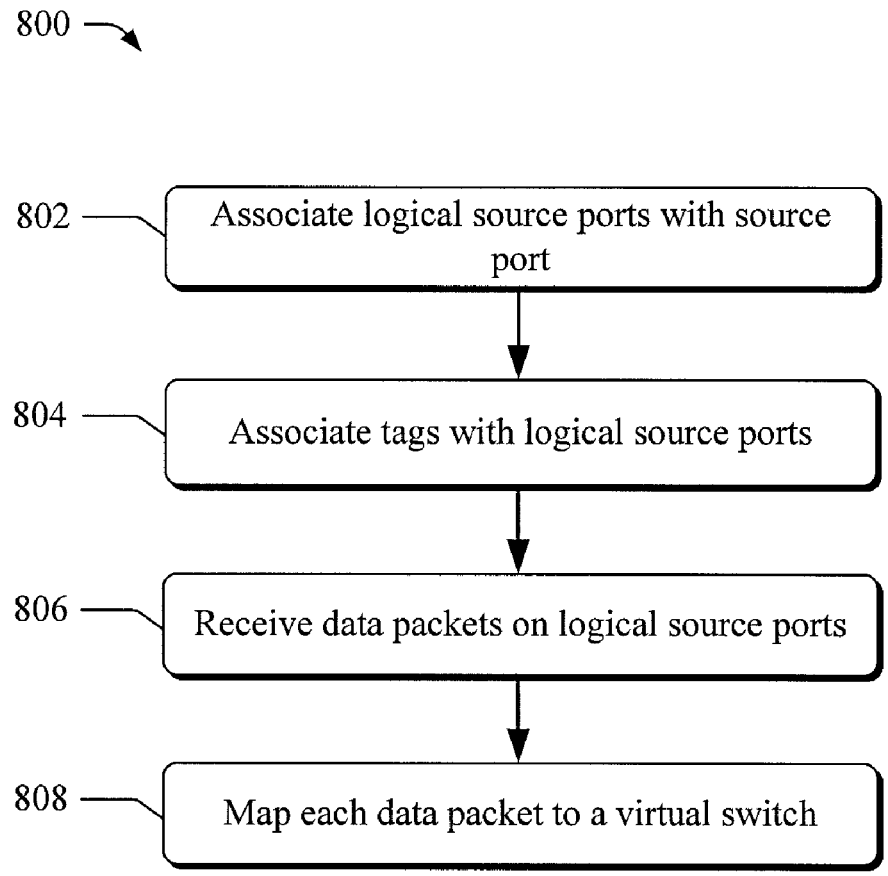
FIG. 8 is an exemplary process illustrating various embodiments and manners in which the tools map data packets to a virtual switch.

FIG. 8 illustrates another embodiment of the tools as method 800, which is illustrated as a series of blocks representing individual operations or acts performed by the tools. At block 802, the tools associate a plurality of logical source ports with a source port. The logical source ports may be the logical ports described above in relation to FIGS. 4, 5, and 6. The tools may associate the logical source ports with the source port by receiving a configuration from a management system as was described above in relation to FIG. 4. Alternatively, the tools may associate the logical source ports with the source port as a result of a manual configuration instruction or a configuration file.

At block 804, the tools associate one of a plurality of tags with each of the logical source ports. One way the tools may associate the tags with the logical source ports is by receiving a configuration from a management system containing the association as was described above in relation to FIG. 4. Alternatively, the tools may associate the tags with the logical source ports as a result of a manual configuration instruction or a configuration file.

Each of the tags is unique and comprises a tag type and a tag value. The tag type identifies a format to which the tag value conforms, such as one of the formats described above in relation to FIG. 3. Each logical source port is associated with a different tag, and each of these associated tags has a different tag type.

At block 806, the tools receive a plurality of data packets on the source port. At least one of the data packets is received on each of the logical source ports associated with the source port. Each data packet received on a particular logical source port includes the tag that was associated with the particular logical source port above at block 804.

At block 808, the tools map each data packet to one of a plurality of virtual switches. The mapping is based on the logical source port on which the data packet is received. As was described above in relation to FIG. 4, each logical source port may be associated with a virtual switch. This association may be used to map each data packet to the virtual switch associated with the logical source port on which the data packet was received.

Figure 9:
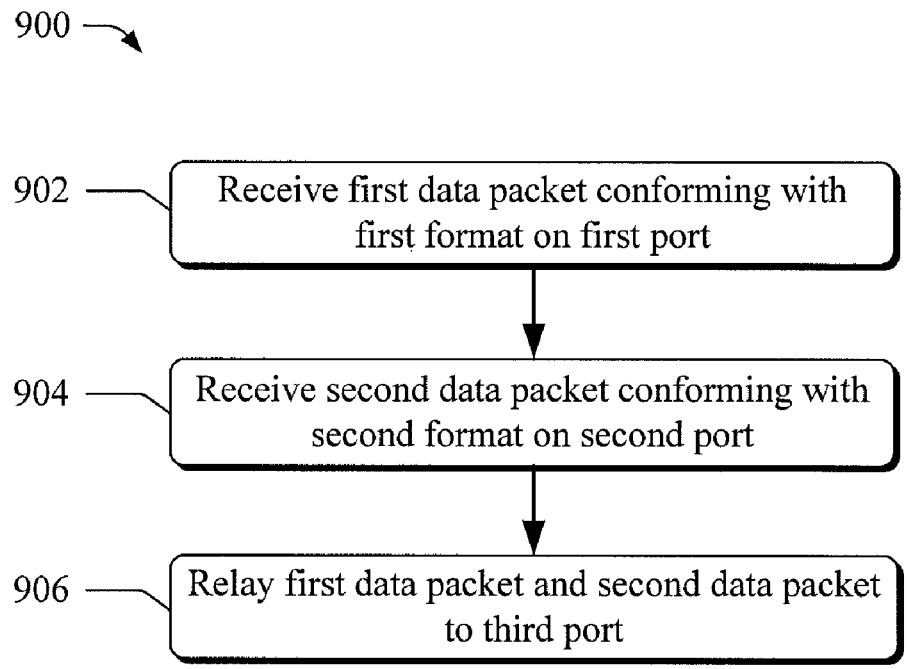
FIG. 9 is an exemplary process illustrating various embodiments and manners in which the tools relay a first data packet conforming to a first format and a second data packet conforming to a second format to a port.

FIG. 9 illustrates another embodiment of the tools as method 900, which is illustrated as a series of blocks representing individual operations or acts performed by the tools. At block 902, the tools receive a first data packet on a first port of a data-packet switch. The first data packet comprises a first tag that occupies a portion of the first data packet, such as the tag described above in relation to FIG. 3. The first tag conforms to a first format such as one of the formats also described above in relation to FIG. 3. The first port is connected to a first data device. This device is incapable of relaying data packets conforming to a format other than the first format. In this way, the first data device is similar to the data devices described above in relation to FIG. 1.

At block 904, the tools receive a second data packet on a second port of a data-packet switch. The second data packet comprises a second tag that occupies a portion of the second data packet, such as the tag described above in relation to FIG. 3. The second tag conforms to a second format such as one of the formats also described above in relation to FIG. 3. The second port is connected to a second data device. This device, like the first data device, is incapable of relaying data packets conforming to a format other than the second format.

At block 906, the tools relay both the first data packet and the second data packet to a third port of the data-packet switch. The third port is capable of transmitting data packets conforming to the first format and is also capable of transmitting data packets conforming to the second format. In this way, the third port is similar to the port of switch 110 connected to link 130 described above in relation to FIG. 1.

CONCLUSION

The above-described tools enable data-packet switches to forward data packets having tags conforming to different formats. By so doing, the tools may reduce the number of links in a network by aggregating data packets having tags conforming to different formats onto a single link. Although the tools have been described in language specific to structural features and/or methodological acts, it is to be understood that the tools defined in the appended claims are not necessarily limited to the specific features or acts described. Rather, the specific features and acts are disclosed as exemplary forms of implementing the tools.

The invention claimed is:

1. A method of transmitting data packets having tag values conforming to different formats on a link comprising:

a packet switch receiving a data packet on each of a plurality of switch ports of the packet switch, each data packet comprising an Ethernet destination address and comprising a tag occupying a portion of the data packet, the tag comprising tag type bits and tag value bits, the tag type bits identifying a format to which the tag value bits conform, the tag type bits of a first one of the data packets being different from the tag type bits of a second one of the data packets;

the packet switch forwarding each of the data packets to a common destination port of the packet switch, the common destination port being configured to transmit data packets having a plurality of tag types;

the packet switch multiplexing the data packets onto a link connected to the common destination port by transmitting the data packets on the link one at a time; and for individual ones of the multiplexed data packets, the packet switch transmitting the Ethernet destination address of the individual multiplexed data packet prior to transmitting the tag of the individual multiplexed data packet.

2. The method of claim 1, wherein:

each switch port comprises at least one logical port, each logical port relaying data packets having a particular tag;

the data packets received on each of the plurality of switch ports are received on one of the logical ports of each of the plurality of switch ports; and the common destination port comprises a plurality of logical ports.

3. The method of claim 2, further comprising:
mapping each data packet to a different one of a plurality of virtual switches based on the logical port on which the data packet is received;
confining each data packet to its mapped virtual switch by allowing the data packet to be forwarded to a logical port associated with the mapped virtual switch but preventing the data packet from being forwarded to a logical port not associated with the mapped virtual switch; and
forwarding each data packet, within its mapped virtual switch to a logical port associated with the mapped virtual switch that is one of the logical ports of the common destination port.

4. The method of claim 3, wherein forwarding further comprises forwarding the data packet to the logical port associated with the mapped virtual switch based on metadata associated with the data packet.

5. The method of claim 3, wherein:
the tag is an original tag;
mapping each data packet further comprises after the receiving of the data packet, replacing the data packet's original tag with a provisional Virtual Local Area Network (VLAN) tag, the provisional VLAN tag comprising provisional VLAN tag type bits and provisional VLAN tag value bits;
confining confines each data packet to a VLAN associated with the provisional VLAN tag; and
forwarding further comprises after the replacing of the data packet's tag with the provisional VLAN tag and prior to the multiplexing of the packets onto the link, replacing the provisional VLAN tag with a transmission tag, the transmission tag comprising transmission tag type bits and transmission tag value bits and the transmission tag being different than the original tag.

6. The method of claim 5, wherein the tag type bits are original tag type bits, the tag value bits are original tag value bits, the transmission tag type bits are different from the original tag type bits and the transmission tag value bits are different than the original tag value bits.

7. The method of claim 5 wherein the replacing of the data packet's original tag comprises overwriting at least a portion of the data packet's original tag.

8. The method of claim of claim 5 wherein the replacing of the provisional VLAN tag comprises overwriting at least a portion of the provisional VLAN tag.

9. The method of claim 3 wherein the mapping of the data packets comprises replacing the tags of the data packets with provisional VLAN tags;
the confining of the data packets comprises confining the data packets to VLANs associated with the provisional VLAN tags; and
further comprising removing the provisional VLAN tags from the data packets after the confining and prior to the multiplexing of the data packets onto the link.

10. The method of claim 3 wherein the mapping of the data packets comprises replacing the tags of the data packets with provisional tags;
the mapped virtual switches are associated with the provisional tags; and
further comprising removing the provisional tags from the data packets after the confining and prior to the multiplexing of the data packets onto the link.

11. The method of claim 1 further comprising:
after the receiving of the data packets, modifying the data packets to comprise provisional tags;
after the modifying of the data packets, confining the data packets to virtual switches associated with the provisional tags; and
after the confining and prior to the multiplexing, removing the provisional tags from the data packets.

12. The method of claim 1 further comprising:
transmitting a standard Ethernet preamble immediately prior to the transmitting of the Ethernet destination address; and
transmitting a standard Ethernet inter-frame gap immediately prior to the transmitting of the standard Ethernet preamble.

13. The method of claim 1 wherein the packet switch receiving a data packet on each of a plurality of switch ports of the packet switch comprises the packet switch receiving a first one of the data packets on a first one of the switch ports of the plurality and the packet switch receiving a second one of the data packets on a second one of the switch ports of the plurality, the first one of the switch ports being connected to a second packet switch and the second one of the switch ports being connected to a third packet switch wherein the first, second, and third packets switches are physically distinct from one another and are remotely located from one another.

14. The method of claim 13 wherein:
a port of the second packet switch is connected to the first one of the switch ports of the plurality;
a port of the third packet switch is connected to the second one of the switch ports of the plurality; and
tag type bits of packets transmitted by the second packet switch via the port of the second packet switch are different than tag type bits of packets transmitted by the third packet switch via the port of the third packet switch.

15. The method of claim 1 wherein the multiplexed data packets are identical to the received data packets and further comprising prior to the packet switch forwarding each of the data packets to a common destination port of the packet switch, for individual ones of the received data packets, the packet switch examining the Ethernet destination address of the individual received data packet and based on the examining, determining that the individual received data packet should be forwarded to the common destination port.

16. The method of claim 1 further comprising:
a second packet switch receiving the multiplexed data packets via the link;
the second packet switch forwarding a first one of the multiplexed data packets to a third packet switch without modifying the first one of the multiplexed data packets, the third packet switch being physically distinct and remotely located from the second data packet; and
the second packet switch forwarding a second one of the multiplexed data packets to a fourth packet switch without modifying the second one of the multiplexed data packets, the fourth packet switch being physically distinct and remotely located from both the second data packet and the third packet switch.

17. A data-packet switch operating method comprising:
a data-packet switch receiving a first data packet from a first data device via a first port of the data-packet switch, the first data packet comprising a first Ethernet destination address and comprising a first tag occupying a portion of the first data packet and conforming to a first format, the first port being connected to the first data device and the first data device being physically distinct and remotely located from the data-packet switch and incapable of relaying data packets conforming to a format other than the first format to the first port, and wherein the first tag comprises priority bits configured to convey a priority of the first data packet relative to other data packets;

the data-packet switch receiving a second data packet from a second data device via a second port of the data-packet switch, the second data packet comprising a second Ethernet destination address and comprising a second tag occupying a portion of the second data packet and conforming to the second format, a second port being connected to the second data device and the second data device being physically distinct and remotely located from the data-packet switch and incapable of relaying data packets conforming to a format other than the second format to the second port;

examining the first Ethernet destination address and based on the examination of the first Ethernet destination address, determining that the first data packet should be relayed to a third port of the data-packet switch;

examining the second Ethernet destination address and based on the examination of the second Ethernet destination address, determining that the second data packet should be relayed to the third port;

relaying the first data packet to the third port of the data-packet switch without altering the first data packet and relaying both the first data packet the second data packet to the third port of the data-packet switch without altering the second data packet, the third port being capable of transmitting data packets conforming to the first format and capable of transmitting data packets conforming to the second format; and using the third port, transmitting the first data packet and the second data packet wherein the transmitting comprises transmitting the first Ethernet destination address of the first data packet prior to transmitting the first tag and transmitting the second Ethernet destination address of the second data packet prior to transmitting the second tag.

18. The method of claim 17, wherein the first format comprises a sixteen-bit Ethertype field, a three-bit priority field, and a twelve-bit VLAN identifier field and the second format comprises a sixteen-bit Ethertype field, a twenty-bit Multi-Protocol Label Switching (MPLS) label field, an eight-bit time-to-live field, and a one-bit stack field.

19. The method of claim 17 further comprising:

after the receiving of the first data packet, modifying the first data packet to comprise a provisional tag;

after the modifying of the first data packet, confining the first data packet to a virtual switch associated with the provisional tag; and after the confining and prior to the transmitting of the first tag, removing the provisional tag from the first packet.

20. A method of aggregating data packets having tag values conforming to different formats comprising:

receiving a data packet on each of a plurality of switch ports, each data packet comprising a tag occupying a portion of the data packet, the tag comprising tag type bits and tag value bits, the tag type bits identifying a format to which the tag value bits conform, the tag type bits of a first one of the data packets being different from the tag type bits of a second one of the data packets;

forwarding each of the data packets to a common destination port, the common destination port being configured to transmit data packets having a plurality of tag types;

multiplexing the data packets onto a link connected to the common destination port;

wherein:
  each switch port comprises at least one logical port relaying data packets having a particular tag;
  the data packets received on each of the plurality of switch ports are received on one of the logical ports of each of the plurality of switch ports; and
  the common destination port comprises a plurality of logical ports; and further comprising:

mapping each data packet to a different one of a plurality of virtual switches based on the logical port on which the data packet is received;

confining each data packet to its mapped virtual switch by allowing the data packet to be forwarded to a logical port associated with the mapped virtual switch but preventing the data packet from being forwarded to a logical port not associated with the mapped virtual switch;

forwarding each data packet, within its mapped virtual switch to a logical port associated with the mapped virtual switch that is one of the logical ports of the common destination port;

wherein the mapping of the data packets comprises replacing the tags of the data packets with provisional VLAN tags;

the confining of the data packets comprises confining the data packets to VLANs associated with the provisional VLAN tags; and further comprising removing the provisional VLAN tags from the data packets after the confining and prior to the multiplexing of the data packets onto the link.

* * * * *